(12) United States Patent
Fitzgerald et al.

(10) Patent No.: US 8,344,998 B2
(45) Date of Patent: Jan. 1, 2013

(54) GESTURE-BASED POWER MANAGEMENT OF A WEARABLE PORTABLE ELECTRONIC DEVICE WITH DISPLAY

(75) Inventors: Alissa M. Fitzgerald, Menlo Park, CA (US); Ely K. Tsern, Los Altos, CA (US); David J. Mooring, Los Altos Hills, CA (US); James A. Gasbarro, Pittsburgh, PA (US)

(73) Assignee: WIMM Labs, Inc., Los Altos, CA (US)

( * ) Notice: Subject to any disclaimer, the term of this patent is extended or adjusted under 35 U.S.C. 154(b) by 991 days.

(21) Appl. No.: 12/356,457

(22) Filed: Jan. 20, 2009

(65) Prior Publication Data
US 2009/0195497 A1 Aug. 6, 2009

Related U.S. Application Data

(60) Provisional application No. 61/025,703, filed on Feb. 1, 2008.

(51) Int. Cl.
*G09G 5/00* (2006.01)

(52) U.S. Cl. ......................................... 345/156; 715/863
(58) Field of Classification Search ........................ None
See application file for complete search history.

(56) References Cited

U.S. PATENT DOCUMENTS

| | | | |
|---|---|---|---|
| 3,944,878 A * | 3/1976 | Gerontakis | 315/316 |
| 4,272,045 A * | 6/1981 | Phillips | 244/170 |
| 6,118,485 A * | 9/2000 | Hinoue et al. | 348/373 |
| 6,244,873 B1 | 6/2001 | Hill et al. | |
| 6,606,406 B1 * | 8/2003 | Zhang et al. | 382/154 |
| 6,925,850 B2 * | 8/2005 | Comer et al. | 73/1.75 |
| 7,519,703 B1 * | 4/2009 | Stuart et al. | 709/224 |
| 2001/0048364 A1 | 12/2001 | Kalthoff et al. | |
| 2002/0130822 A1 * | 9/2002 | Fukumura | 345/39 |
| 2005/0140933 A1 * | 6/2005 | Cannon et al. | 353/37 |
| 2005/0243061 A1 * | 11/2005 | Liberty et al. | 345/158 |
| 2005/0243062 A1 * | 11/2005 | Liberty | 345/158 |
| 2006/0022963 A1 * | 2/2006 | Bosch et al. | 345/179 |
| 2006/0176268 A1 * | 8/2006 | Oquist et al. | 345/156 |
| 2006/0286972 A1 | 12/2006 | Kates | |
| 2007/0208544 A1 | 9/2007 | Kulach et al. | |
| 2009/0079701 A1 * | 3/2009 | Grosskopf, Jr. | 345/173 |
| 2010/0061593 A1 * | 3/2010 | MacDonald et al. | 382/103 |
| 2010/0079508 A1 | 4/2010 | Hodge et al. | |
| 2010/0167686 A1 | 7/2010 | Pan | |
| 2012/0007801 A1 * | 1/2012 | Banning | 345/156 |

FOREIGN PATENT DOCUMENTS

| WO | WO9839842 | 9/1998 |
|---|---|---|
| WO | WO2005040991 | 5/2005 |

OTHER PUBLICATIONS

"Gesture Write and GesturePad: Unobtrusive Wearable Interaction Devices", <http://coblitz.codeen.org:3125/citeseer.ist.psu.edu/cache/papers/cs/23839/http:zSzzSzwww.csl.sony.co.jpzSzpersonzSzrekimotozSzpaperszSziswc01.pdf/rekimoto01gesturewritst.pdf>, 2001.

(Continued)

*Primary Examiner* — Van Chow
(74) *Attorney, Agent, or Firm* — Convergent Law Group LLP

(57) ABSTRACT

Methods and systems for providing gesture-based power management for a wearable portable electronic device with display are described. An inertial sensor is calibrated to a reference orientation relative to gravity. Motion of the portable device is tracked with respect to the reference orientation, and the display is enabled when the device is within a viewable range, wherein the viewable range is a predefined rotational angle range in each of x, y, and z axis, to a user based upon a position of the device with respect to the reference orientation. Furthermore, the display is turned off if an object is detected within a predetermined distance of the display for a predetermined amount of time.

28 Claims, 7 Drawing Sheets

OTHER PUBLICATIONS

"Orientation-based Interaction for Mobile Devices", <http://hci.stanford.edu/srk/cs377a-mobile/project/final/darnauer-garrity-kim.pdf>, Mar. 2005.

Oceanus watches includes chronographs, three-hand sol . . . [retrieved on Nov. 5, 2008] from http://www.oceanus-us.com/index.php?fuseaction=features.home.

* cited by examiner

GESTURE-BASED POWER MANAGEMENT OF A WEARABLE PORTABLE ELECTRONIC DEVICE WITH DISPLAY

CROSS-REFERENCE TO RELATED APPLICATIONS

This application claims the benefit of U.S. Provisional Patent Application No. 61/025,703, filed Feb. 1, 2008, assigned to the assignee of the present application, and incorporated herein by reference.

BACKGROUND OF THE INVENTION

Over the last decade, the rapid improvement of silicon, packaging, integration, battery, wireless, and display technologies has enabled a wide variety of small, portable electronic devices with vastly improved levels of functionality, form factor, and performance. Much of these advances have been driven by the popularity of pocket-sized devices, such as cell phones and MP3 players. These devices now utilize high-resolution color displays, high performance processors, fast and large capacity memories, wireless interconnectivity, and rich user interfaces. However, few of these advanced technologies have crossed over into small wearable devices, such as watches. Because of severe size and battery constraints, wearable electronic devices have had limited functionality and have typically used low power, simplistic electronic displays, such as monochrome LCD or segmented LED. In the past, efforts to incorporate greater performance and functionality into wearable devices have led to large, bulky designs that were awkward to use, expensive, and limited in battery life. To integrate these advanced technologies into wearable form factors, innovation is required, particularly in the area of power management.

BRIEF SUMMARY OF THE INVENTION

Methods and systems for providing gesture-based power management for a wearable portable electronic device are described. An inertial sensor is calibrated to a reference orientation relative to gravity. Motion of the portable device is tracked with respect to the reference orientation, and the display is enabled when the device is within a viewable range, wherein the viewable range is a predefined rotational angle range in each of x, y, and z axis, to a user based upon a position of the device with respect to the reference orientation. Furthermore, the display is turned off if an object is detected within a predetermined distance of the display for a predetermined amount of time.

BRIEF DESCRIPTION OF SEVERAL VIEWS OF THE DRAWINGS

The drawings illustrate the design and utility of embodiments of the invention, in which similar elements are referred to by common reference numerals. In order to better appreciate the embodiments, reference should be made to the accompanying drawings that illustrate these embodiments. However, the drawings depict only some embodiments of the invention, and should not be taken as limiting its scope. With this caveat, embodiments of the invention will be described and explained with additional specificity and detail through the use of the accompanying drawings in which.

DETAILED DESCRIPTION OF THE INVENTION

Figure 1A:
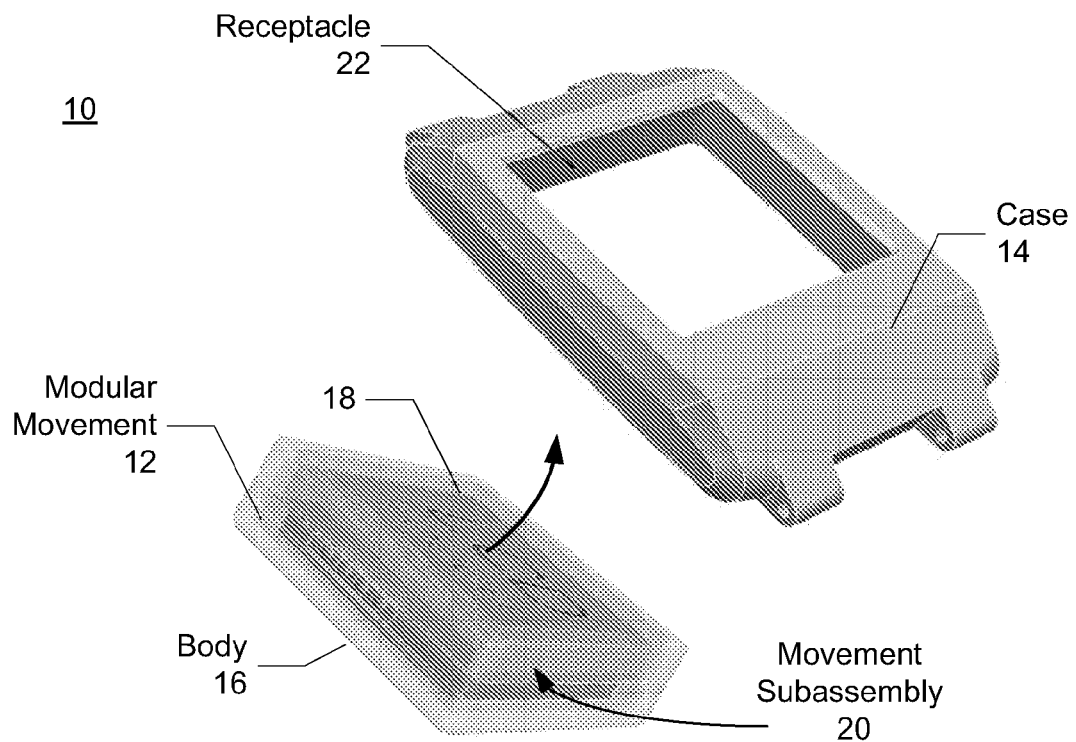
FIGS. 1A-1B are diagrams illustrating exemplary embodiments of a wearable portable electronic device having gesture-based power management.

The present invention relates to a method and system for gesture-based power management for a wearable portable electronic device with display. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

In the following description, for purposes of explanation, numerous details are set forth in order to provide a thorough understanding of various embodiments. It is important to note that the invention can be practiced without all of these details. Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The exemplary embodiment of the present invention provides a method and system for managing power consumption of a wearable portable electronic device (the "portable device"). To make the portable device easy and natural to use, it would be ideal if such a device appeared like a regular mechanical watch, which always presents a clock face, rather than the dark screen of an electronic display that needs to be manually turned on. However, high-resolution color displays consume a large amount of power. Leaving these displays on all the time is impractical, as it would quickly drain an already small battery. In fact, the display typically has the highest power consumption of all components in a portable system.

The exemplary embodiment automatically turns on the portable device and/or its display when the device is in a viewable orientation without any efforts such as pushing a button or touching the device with the other hand.

In an exemplary embodiment, the portable device may include a portable data and communications device that is implemented as a modular movement (the "module") that can be removably inserted within a case of a portable device. In the exemplary embodiments shown, the portable device comprises a watch although the bands are not shown, but the portable device may represent other types of devices, as described below. The module may be fully-functional standalone and thereby retain functionality after removal from the portable device, but may also be easily user-interchangeable with other portable devices.

In an alternative embodiment, the portable device 10 functions as a stand-alone device, without using a module to provide the below-described power management functionality.

Figure 1B:
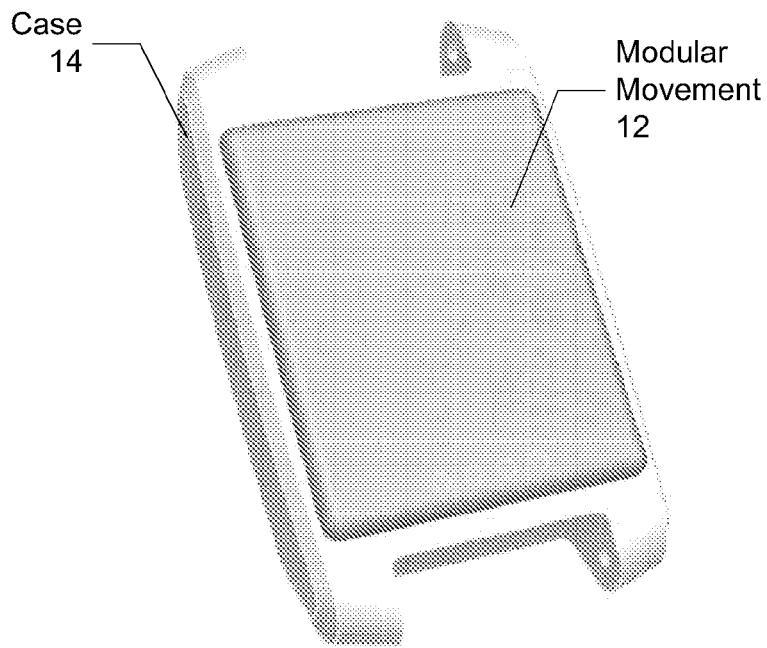
Figure 2:
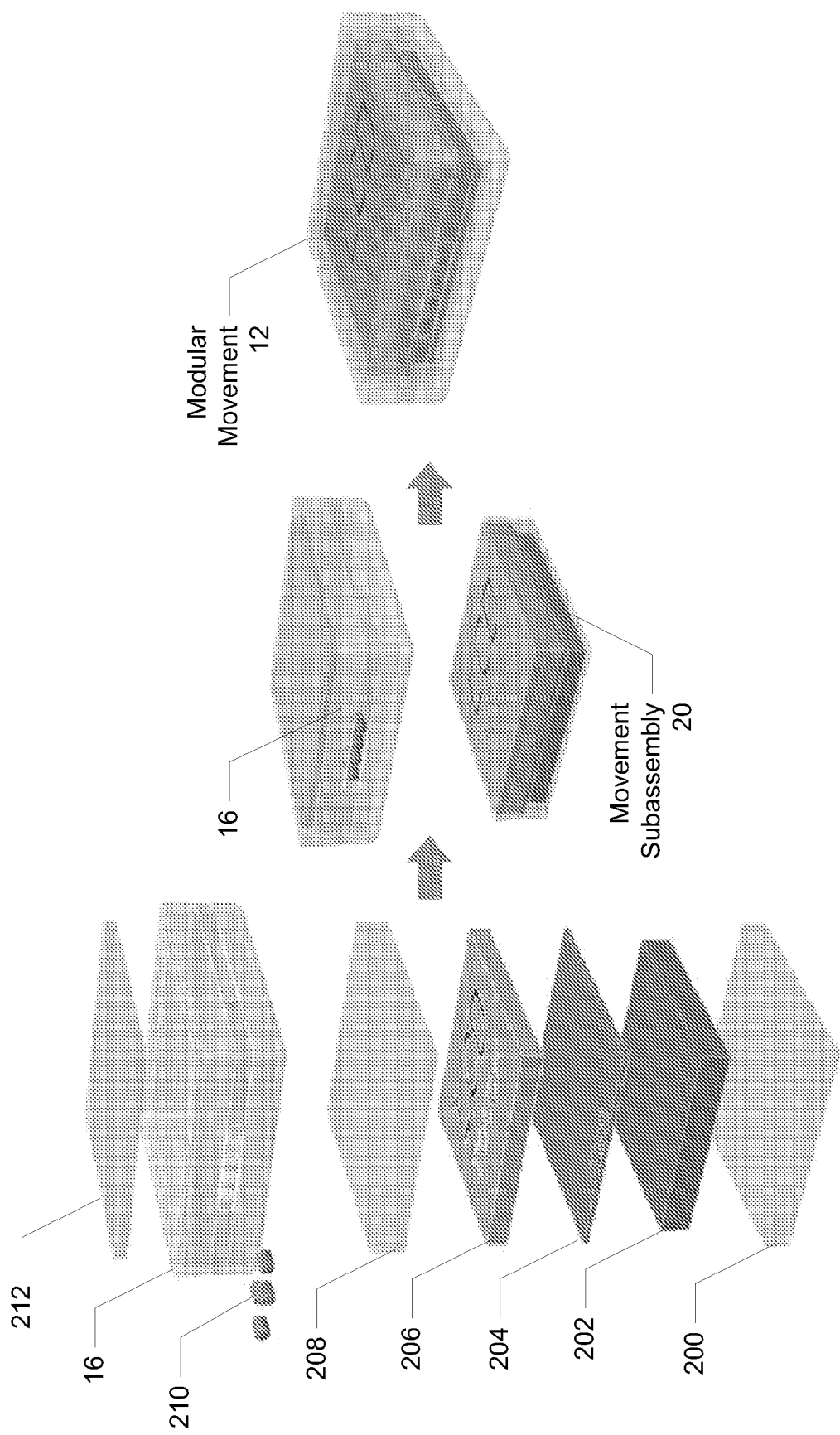
FIG. 2 is a diagram of an exploded view of the portable device and components thereof when implemented as a computer-based electronic modular movement according to one exemplary embodiment.

FIGS. 1A-1B and 2 are block diagrams illustrating exemplary embodiments of a portable device 10 having a module where like components have like numerals have like reference numerals. According to the exemplary embodiments, the module 12 includes a body 16 that houses a plurality of layers, including an integrated display 18 (which may be touchscreen) and a movement subassembly 20, for displaying information, including time. FIG. 1A is a diagram of module 12 shown with a semitransparent body 16 for convenience so that subassembly 20 can be seen through case 16.

As used herein, the term "modular" means that the body 16 of the module 12 includes all parts necessary for operation and power of the module 12. Thus, the module 12 of the exemplary embodiment is fully functional in a standalone state. However, according to the exemplary embodiment, the case 14 of the portable device 10 includes a receptacle 22 for removably receiving the module 12 without need for a tool, such that the module 12 can be either used with the case 14 of the portable device 10 and/or is user interchangeable with the cases of other electronic devices having the same or similar types of receptacles.

In one embodiment, the body 16 may be constructed to provide the module 12 with a degree of water resistance and dust protection. For example, the body 16 may be a single shell except for an opening for the display 18 and once the display 18 is in place, the display 18 may by sealed with the body 16 using traditional waterproofing methods. In another embodiment, the body 16 may be assembled in separate pieces but then sealed once assembled.

In one exemplary embodiment, the module 12 and the receptacle 22 in the case 14 are made industry standard sizes, such that different modules 12 manufactured and sold by a one set of manufacturers fit within the receptacles of different cases manufactured and sold by another set of manufacturers, for example.

FIGS. 1A and 1B show an embodiment where the receptacle 22 is formed as an opening in the back of the case 14 and where the top or front of the case 14 includes an opening. In this embodiment, the module 12 is inserted into the case 14 from the bottom or back of the case 14, and once inserted the display 18 of the module 12 is visible through the opening in the top of the case 14. When the module 12 is used in an portable device 10, such as a watch, the display 18 of the module of movement 12 becomes the display 18 of the portable device.

The display 18 can include a display assembly including a color LCD display, a glass overlay and a touch overlay. The display 18 may form the top of the portable device 10 in an exemplary embodiment. The display 18 can be color, monochrome, black and white, or grayscale. The glass in the display 18 can be a number of different materials, including glass, tempered glass, quartz, plastic, soda lime glass, white soda lime glass, aluminosilicate, and/or sapphire. The glass represents some transparent barrier between the outside world and the display area. In some embodiments, the display includes an active viewable area of 25.4 (H)×25.4 (V) mm, with a display resolution between approximately 128 (H)× 128 (V) and 200 (H)×200 (W) pixels. Other embodiments include other display resolutions. The display 18 may also include a wireless antenna for communications with, for example, a Bluetooth headset. In some embodiments the display 18 has an active area that measures less than 2.5" diagonally (in other embodiments, less than 2" diagonally).

In one embodiment, the depth or thicknesses of the module 12 and the case 14 may be designed to be substantially similar, so that when the module 12 is inserted, the side of the module 12 facing the open end of the receptacle 22 is coplanar with the back of the case 14 (and the wearer's arm), as shown in FIG. 1A. Once the module 12 is inserted into the receptacle 22, in one embodiment, no closure is necessary to seal the case 14 unlike with traditional watches.

Also, once inserted, the display 18 of the module 12 that is open through the top of the case 14 may be designed to be approximately coplanar with, slightly above, or slightly below, the top of the case 14.

As used herein, the portable device 10 may include a combination of both the case 14 and the module 12. But the term case 14 may denote the body of the portable device 10 into which the receptacle 22 is formed and into which the module 12 is to be inserted. Thus, for small portable devices 10, such as a watch, the proportionate size of the portable device/case to the receptacle 22 is small (FIGS. 1A and 1B). But for larger portable devices, the size of the portable device/case to the receptacle 22 may be larger.

According to another aspect of the exemplary embodiment, the module 12 is implemented as a computer-based electronic movement that is used to power the portable devices into which it is inserted, as described below.

FIG. 2 is a diagram of an exploded view of the module 12 and components thereof when implemented as a computer-based electronic modular movement according to one exemplary embodiment. As shown, the module 12 includes body 16 that houses multiple layers of components, which in this exemplary embodiment, may include a plastic internal chassis 200, a rechargeable-type battery 202, a printed circuit board (PCB) 204, a touchscreen 206, and an optional second plastic internal chassis 208 and protective covering 212. In this embodiment, the module 12 has six sides, but the side with the touchscreen 206 is substantially all display space.

The PCB 204 may include components (described below) such as a memory and processor for executing software that displays a user interface on the touchscreen 206 and that operates the module 12; and an optional communications interface for receiving data remotely, which may be displayed and updated on the touchscreen 206.

Other components of the module 12 may include an antenna (not shown) that wraps around the body 16 (alternatively embedded in case 14), and a set of contacts 210 inserted into the body 16 and in contact with the PCB. The contacts may be used for recharging the battery (the contacts are both power and ground) and/or for serialized communications. The contacts can also be used for orientation purposes for the user to tell which side of the module 12 is up or down when inserting the module 12 into the receptacle 22 of the case 14. In one embodiment, the contacts 210 are located on a side of the module 12 that is in the receptacle 22 opening so that the portable device 10 as a whole can be placed in a dock and the contacts 210 used to abut the contacts of the dock. In another embodiment, the contacts 210 are located on a side of the module 12 that face inward into the receptacle 22 for abutting with contacts in the receptacle 22. In yet another embodiment, the contacts 210 may be located on the module 12 such that the contacts 210 wrap around at least two side of the module 12 to be used in both manners.

During assembly, the contacts 210 are inserted into the body 16; and the layers of components are assembled as shown into a movement subassembly 20. The movement subassembly 20 is then inserted into the body 16 and the body is sealed, creating the computer-based module 12.

Figure 3:
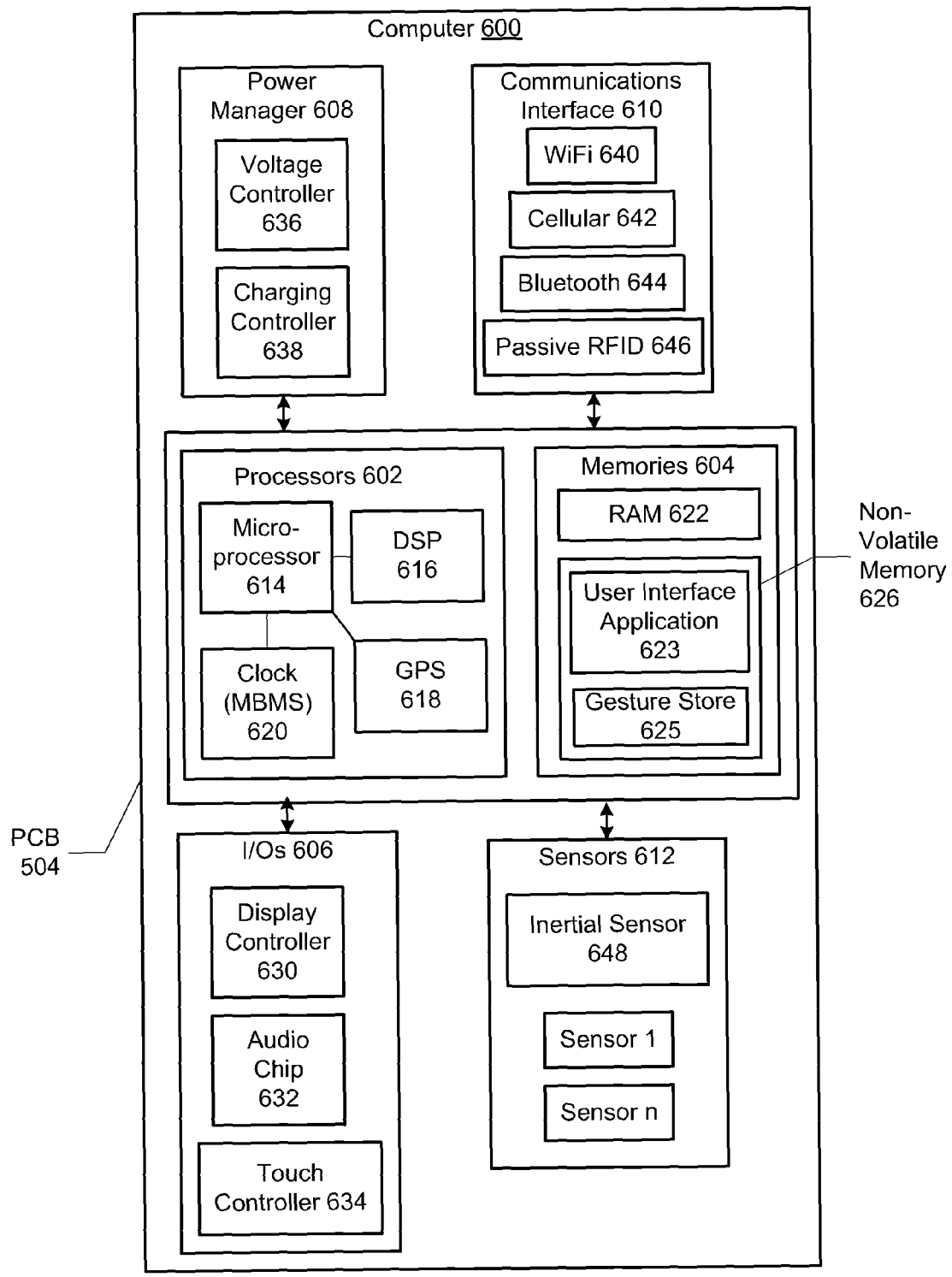
FIG. 3 is a block diagram illustrating computer components on the PCB comprising the wearable portable electronic device having gesture-based power management according to an exemplary embodiment.

FIG. 3 is a block diagram illustrating computer components on the PCB comprising the module 12 according to an exemplary embodiment. In one embodiment, the PCB 504 containing computer 600 may be implemented as a single sided or double-sided PCB. In another embodiment, the PCB 504 may be implemented as separate PCBs and stacked within the movement subassembly 514.

Computer 600 may include components such as processors 602, memories 604, inputs/outputs 606, power manager 608, a communications interface 610, and sensors 612. In one embodiment, one or more of the components of the computer 600 may be implemented on a single chip.

The processors 602 may include at least one microprocessor 614, a digital signal processor (DSP), a global positioning system (GPS) chip 616, and a clock 620. Microprocessor 614 and/or DSP may be capable of concurrently executing multiple software routines, including system code, to control the various processes of the module 12. In one embodiment, microprocessor 614 may comprise an Advanced RISC Machine (ARM) processor or the like may be used, for example. GPS 618 may process received satellite signals and with or without microprocessor 614 determine position information such as location, speed, direction, and time.

Clock 620 may be used as an internal timing device for the computer 600. Clock 620, which may also be referred to as a real-time clock or system clock, inputs to the microprocessor 614 a constant flow of timing pulses for operation of the microprocessor 614. Clock 620 may also keep track of the time of day and makes this data available to the software routines executing in microprocessor 614. In one embodiment, clock 620 comprises a silicon oscillator clock implemented using micro-electro-mechanical systems (MEMS) technology. In another embodiment, clock 620 may utilize a quartz crystal oscillator.

Memories 604 may include a random access memory (RAM) 622 and a non-volatile memory 626. RAM 622 may be used as the main memory for microprocessor 614 for supporting execution of the software routines and other selective storage functions. Non-volatile memory 626 is capable of holding instructions and data without power and may store the software routines for controlling module 12 in the form of computer-readable program instructions. In one embodiment, non-volatile memory 626 comprises flash memory. In alternative embodiments, non-volatile memory 626 may comprise any type of read only memory (ROM).

The non-volatile memory 626 may contain a user interface application 623, which can provide functionality for the portable device 10 and can output a graphical user interface on the display 18. The non-volatile memory 626 can include a gesture store 625 (e.g., a database, or a look-up table), which can contain definitions of different gestures in the form of combinations of sensor inputs, defined here as "gesture rules," and predetermined functions associated with the gestures that are executed upon identification of the gestures.

When executed, the user interface application 623 can access the gesture rules stored in gesture store 625 when movement of the portable device 10 is sensed. When the movement satisfies the rules in a gesture definition, the predetermined function may be executed.

I/Os 606 may include a display controller 630, an audio chip 632, and a touchscreen controller 634. Display controller 630 may access RAM 622 and transfer processed data, such as time and date and/or a user interface, to the touchscreen 506 for display. The audio chip 632 is coupled to an optional speaker (not shown) and interfaces with microprocessor 614 to provide audio capability for the module 12. In another embodiment, the audio chip 632 may be coupled to both a speaker and a microphone (not shown). In this embodiment, a water resistant/proof speaker and microphone may be used to retain water resistance of the module 12. In an alternative embodiment, the module 12 may be implemented without sound capability, in which case no audio chip 632, speaker or microphone is necessary.

In the embodiment where the audio chip 632 is coupled to both a speaker and microphone, the microphone may record voice input that is first processed by the audio chip and then input to the microprocessor 614 for further processing. The audio chip 632 may include hardware and/or software that converts analog voice into pulse code modulation (PCM) or Adaptive Differential PCM (ADPCM) digital code and vice versa, as well as for compressing and decompressing the PCM or ADPCM digital audio signal. In one embodiment, the processed voice input may be stored for subsequent playback. In another embodiment, the processed voice input may be transferred to communications interface 610 for wireless transmission.

Touchscreen controller 634 may interface with the touchscreen 506 to detect touches and touch locations and pass the information on to microprocessor 614 for determination of user interactions. Another example I/O 606 may include a USB controller (not shown).

Power manager 608 communicates with the microprocessor 614 and coordinates power management for the computer 600 while the computer is drawing power from the battery 502 during normal operations. In one embodiment, the battery 502 may comprise a rechargeable, lithium ion battery or the like may be used, for example. The power manager 608 includes a voltage controller 636 and a charging controller 638 for recharging the battery 502. Voltage controller 636 may regulate battery voltage to the rest of the computer 600, and charging controller 638 may manage appropriate voltage levels to properly charge the battery 502. Power manager 608 may further include a microcontroller (not shown) in one embodiment.

The communications interface 610 may include components for supporting one-way or two-way wireless communications. In one embodiment, the communications interface 610 is for primarily receiving data remotely, including streaming data, which is displayed and updated on the touchscreen 506. However, in an alternative embodiment, besides transmitting data, the communication interface 616 could also support voice transmission. In an exemplary embodiment, the communications interface 610 supports low and intermediate power radio frequency (RF) communications. The communications interface 610 may include one or more of a WiFi transceiver 640 for supporting communication with a WiFi network, including wireless local area networks (WLAN), and WiMAX; a cellular transceiver 642 for supporting communication with a cellular network; Bluetooth transceiver 644 for low-power communication according to the Bluetooth protocol and the like, such as wireless personal area networks (WPANs); and passive radio-frequency identification (RFID) 646. Others wireless options may include baseband and infrared, for example. The communications interface 610 may also include other types of communications devices (not shown) besides wireless, such as serial communications via contacts 510 and/or USB communications, for example.

The sensors 612 are representative of devices that can take information about the outside world and supply it to the device 10. The sensors 612 can also function with other components to provide user or environmental input and feedback to a user. Sensors 612 may include at least one of each of an inertial sensor 648, and any number of optional sensors 1-*n*. Sensors 612 may include at least one of each of an inertial sensor 648, and any number of optional sensors 1-*n*. Inertial sensor 648 can include a MEMS accelerometer (e.g., a 3-axis accelerometer from ST Microelectronics LIS302DL) that may be used to measure information such as position, motion, tilt, shock, and vibration for use by microprocessor 614. Another example of an inertial sensor includes a gyroscope to provide information about movement of the portable device 10. An inertial sensor 648 that can track can track motion in three dimensions such as those described above may be advantageous because rotational acceleration and absolute deflection may be detected, allowing for more precise tracking of the movement of the portable device 10.

The optional sensors 1-*n* may include environmental sensors (e.g., ambient light (e.g., TPS851 from Toshiba), temperature, humidity, pressure (redundant, an altitude sensor is a pressure sensor), magnetic (e.g., Hall Effect), compass, etc), biological sensors (e.g., pulse, blood oxygen saturation, body temperature, blood pressure, body fat, etc.), and a proximity detector for detecting the proximity of objects. Other examples of sensors include touch screen sensors, haptic sensors, and audio input. In the embodiment where the display 18 comprises a touch screen, the touch screen can be capacitance and/or resistance based, or any other touch sensitive device that provides user touch information. In one embodiment, the proximity detector may be implemented as an infrared data Association (IRDA) proximity detector. The computer 600 may display the information measured from the sensors 612, analyze the information by microprocessor 614 and display the analyzed information, and/or transmit the raw or analyzed information via the communications interface 610. In one embodiment, not all of the sensors 612 may be located on PCB 504.

In one exemplary embodiment, the computer 600 includes a combination of the inertial sensor 648, which may be a MEMS accelerometer (or other inertial sensor capable of motion tracking in at least two dimensions such as a gyroscope), the ambient light sensor, and the proximity sensor, such as an infrared reflective sensor. According to the exemplary embodiment, the combined information from these sensors is used to provide feedback required to determine when the display 18 is visible to the user and should be turned on.

Figure 4:
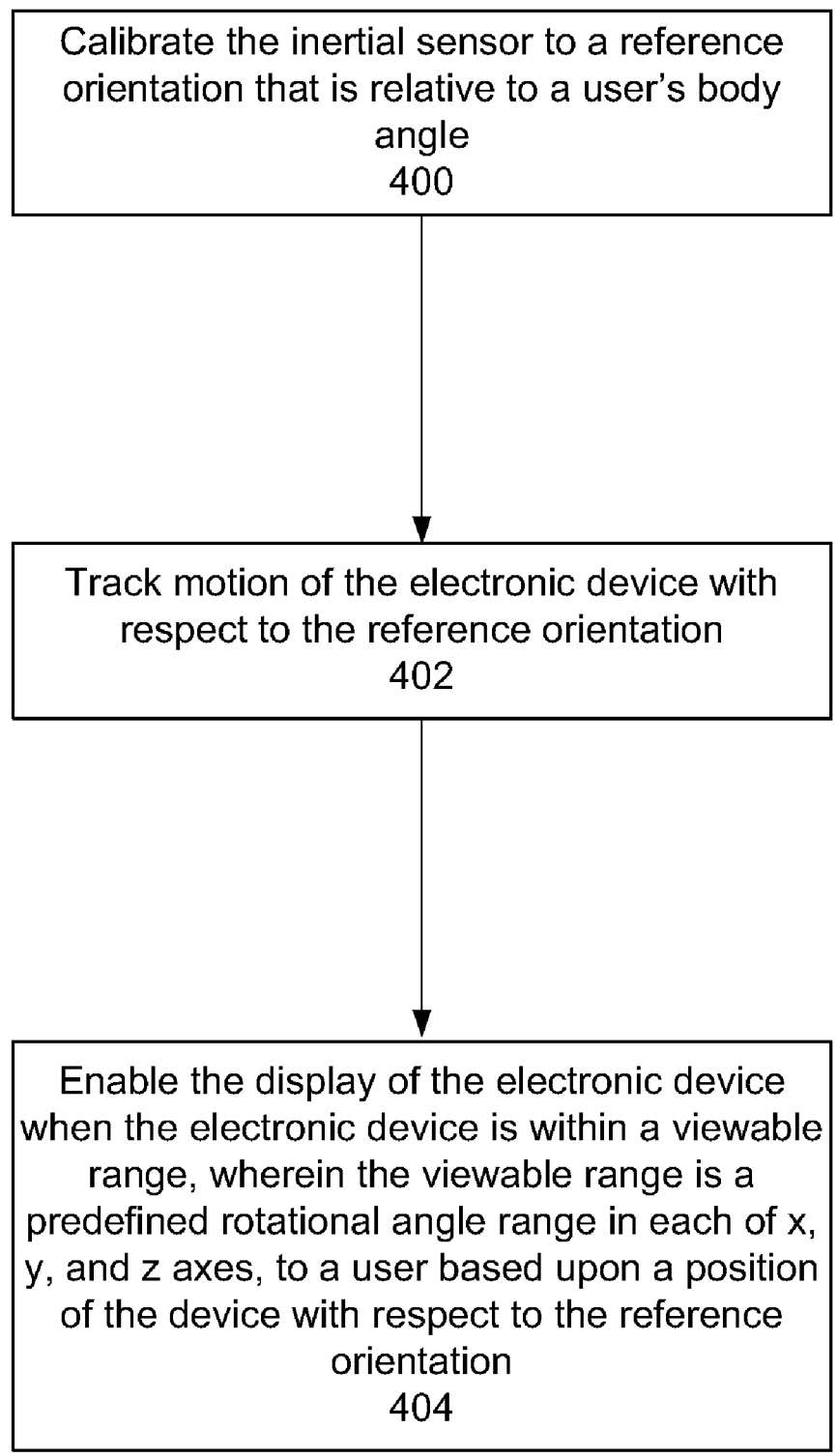
FIG. 4 illustrates an exemplary embodiment of a process for gesture-based power management for a wearable portable electronic device.
Figure 5:
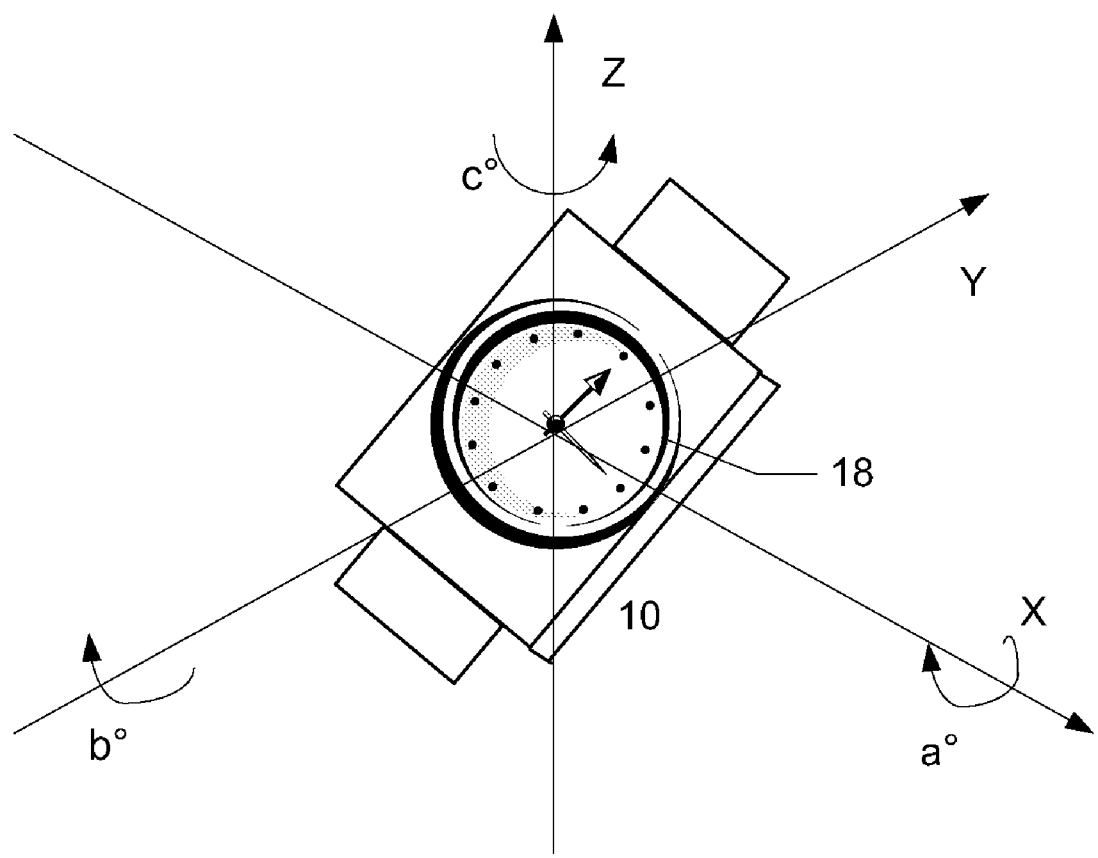
FIG. 5 is a diagram illustrating a reference orientation for calibration.

FIG. 4 illustrates an exemplary embodiment of a process for gesture-based power management for a wearable portable electronic device. First, the inertial sensor 648 is calibrated to a reference orientation that is relative to a user's body angle (block 400). The user's body angle may be defined as the angle substantially between the user's torso and the ground. In the exemplary embodiment, the reference orientation for calibration is shown in FIG. 5, with the display 18 facing up and the arm in front of the user. While the embodiment shown in FIG. 4 uses the earth's gravity as a reference point, meaning the user's body angle is substantially vertical, for the reference orientation, the reference orientation may utilize different body angles to calibrate the inertial sensor 648. In an exemplary embodiment, the portable device 10 may, with or without a user's request, reset the reference orientation from gravitional (i.e., a substantially vertical body angle) to any other user-selected body angle. Examples of body angles may include a substantially horizontal angle (e.g., when the user is lying substantially on his or her back) and an inclined angle (e.g., when the user is reclined in a chair or seat in a car or airplane).

FIG. 5 shows the 3 reference axes, x, y and z, which form a reference coordinate system. The x-axis runs parallel to and in front of the body. The y-axis goes through the body (axis from chest to device). The z-axis runs up and down (from device to the ceiling). FIG. 5 also shows rotational angles a, b, and c, around each axis. Utilizing three-dimensional sensing may be advantageous over electronic devices using fewer sensing axes because angles and positions that a user would use to view the display 18 of the portable device 10 can be more precisely sensed. This can lead to more efficient battery use because the display 18 may not be turned on when the portable device 10 is in an angle and/or position that is excluded.

Referring again to FIG. 4, once the portable device 10 is calibrated to the reference orientation, the inertial sensor tracks motion of the portable device 10 with respect to this reference orientation (block 402). The display 18 is enabled when the device 10 is within a viewable range, where the viewable range is a predefined rotational angle range in each of the x, y, and z axis, to a user based upon a position of the device 10 with respect to the reference orientation (block 404). Enabling the display 18 can take the form of turning on the display 18 so that the user may interact with the user interface application 623. The following rotational angle ranges, in exemplary embodiments, define the spatial positions where the display is viewable when worn on either wrist:

| Display Angle | | Viewable Ranges | |
| --- | --- | --- | --- |
| | | On Left Wrist | On Right Wrist |
| a | rotation on x axis | −30 to +180 deg | −30 to +180 deg |
| b | rotation on y axis | −45 to +45 deg | −45 to +45 deg |
| c | rotation on z axis | −180 to +90 deg | −90 to +180 deg |

These values allow for a wide range of natural arm and body positions, but may exclude physiologically impossible positions. In the exemplary embodiment, the device 10 must be within all three angle ranges in order for the display 18 to be on. In the exemplary embodiment, these predefined rotational angle ranges can be reconfigured by the user. Additionally, the predefined rotational angle ranges may include different angle ranges corresponding to different wear locations on the body, such as a pendant of a necklace. In an exemplary embodiment, the inertial sensor 648 provides information in the (x,y,z) coordinates, thereby allowing a standard mathematical translation of the viewable angle ranges to (x,y,z) coordinates to be calculated. The microprocessor 614 can track the current (x,y,z) position and actively determine whether the device is within the viewable range.

In an exemplary embodiment, the portable device 10 may detect the user's body angle. The viewable range may then be determined based upon the user's body angle. For example, if the portable device 10 detects that the user's body angle is not substantially vertical (e.g., the user is lying on his or her back, or is sitting in a reclined position), the reference orientation and the viewable range can be automatically adjusted by the difference between the user's body angle and a vertical body angle. In an exemplary embodiment, the user may customize the viewable range when the user is in a different body angle, and store the customized viewable range so that the customized viewable range may be used when the portable device 10 detects that the user has entered the corresponding body angle.

Another common situation with wrist-worn devices is when clothing, such as a person's sleeve, covers the watch face. According to an exemplary embodiment, in this situation, the device display 18 should be turned-off. The display 18 is turned off if an object is detected within a predetermined distance of the surface of the display 18 for a predetermined amount of time. In one embodiment, one or both of the predetermined distance and the predetermined amount of time are user configurable. For example, the proximity sensor can be configured to detect objects within a certain proximity of the display, such as one inch, two inches, 0.5 inches, 1 millimeter, etc. In the exemplary embodiment, the proximity sensor detects an object for a configurable amount of fixed time, such as 10 seconds, before turning off the display. This may avoid erroneous signals caused by normal use of the watch. To further avoid erroneous shut-offs, the object may be detected by a plurality of proximity sensors located on an edge or edges of the display 18. For example, an embodiment might use two or more proximity sensors, one on each opposite corner of the display 18. This would further ensure the entire display was being covered vs. some partial covering of fingers that might occur during normal use. When the detected object is removed, the display should instantly turn back on, assuming that the display is within an allowable visible angle range.

A logical formula describes the algorithm that determines whether the display is ON:

V=display is in allowable visible range for a, b, and c
P=proximity detector does not detect any objects for longer than the programmed fixed time
ON=V AND P As a further optimization, the ambient light sensor can provide the information that determines display brightness. Most electronic display components provide analog brightness control, and the display controller 630 or microprocessor 614 can set the maximum brightness to different levels, depending the reading from the light sensor. This, in itself, is a common technique used on many portable devices, but when used in combination with the other sensors, provides a more effective and adaptive method for managing display power.

Another further optimization can occur if the device also contains a location detection element (such as a GPS chip). Using data on the latitude and longitude of the wearer, and having the current time and date, the processor could compute whether it is day or night. This data can be used to determine the maximum amount of ambient light available, and therefore set a minimum threshold for the display brightness.

Another further optimization involves determining when the portable device 10 will not be viewed by a user, such as when the portable device 10 is not being worn, or when the display 18 is facing the ground. To determine if the portable device 10 is being worn, an additional sensor, such as a skin temperature sensor, capacitance sensor, or electrodes, can be used. If it is being worn, the algorithm described above provides the display control. If it is not worn, the display may be turned off and only turned on by an active user command, such as touching the touchscreen display or pushing a button. Likewise, the inertial sensor 648 may be used to determine if the display 18 is facing the ground (e.g., if the display 18 is parallel to and facing gravitational force) for a predetermined amount of time. If the display is facing the ground for the predetermined amount of time, then the display may be turned off and only turned on by an active user command.

In an exemplary embodiment, the user may enable a "locked mode" for the portable device 10, wherein the display is not enabled even when the user enters a viewable range, by inputting a lock device command. The locked mode can be advantageous, for example, when the user is in a movie theater or asleep, and the lighting of the display would be undesirable. The locked mode can be maintained until the user repeats the lock device command in an exemplary embodiment.

The portable device 10 may have multiple sensors to provide an abundance of data on the device's orientation and environment. Each additional sensor may provide additional information that allows the algorithm to rule in or out a certain condition, further enabling the device to intelligently discriminate between two similar motions with very different intents.

For example, a user's motion to turn the steering wheel of a car results in the wrist being in an orientation that falls within the ranges described above. If the device only contains a single inertial sensor 648, it may be difficult for the algorithm to discriminate between the motions of looking at the watch versus steering a car. A user might become annoyed if the display 18 blinks on and off as he steers a car.

However, if the algorithm can examine both the inertial sensor 648 data and data from a complementary sensor, such as an ambient light sensor, a more accurate assessment can be made. For instance, there are typically many shadow regions inside a car due to the presence of the door, the roof, dashboard lights, etc. The wrist of a user turning a steering wheel would pass through several regions of different light intensity during wrist motion. The ambient light data combined with the inertial data may be used to determine that the user only intended to turn the steering wheel of a car and did not actually want to look at the watch face, thereby preventing the display 18 from turning on unnecessarily.

In an important additional embodiment, the algorithm may employ the techniques of Bayesian inference (a common method known to computer programmers) in order to learn the behavioral patterns of an individual user and therefore make increasingly accurate determinations that the user is truly looking at his watch instead of performing some other gesture. The device 10 may collect and store sensor information that the algorithm will employ to improve its ability, over time, to correctly interpret gestures. Bayesian analysis can be triggered, for example, by detecting that a user enters a "learning mode," wherein the user indicates to the portable device 10 when the user is looking at the display 18 of the portable device 10. The user may indicate that the user is looking at the display 18 by using a predetermined indication, which can be any suitable command recognized by the portable device (e.g., three taps on the side of the portable device 10, etc.). Bayesian analysis can be used, in an exemplary embodiment, to change (e.g., shift the range, narrow the range, or broaden the range) the viewable range after receiving at least one predetermined indication. This can be particularly advantageous when the user uses the portable device 10 during activities, such as running, swimming, or riding a bicycle, for example.

To provide for a more natural, less obtrusive experience, one embodiment could gradually ramp up and/or ramp down the display brightness at the edges of the viewable angle ranges. That is, the display brightness may be gradually increased when entering the predetermined rotational angle ranges and gradually reduced when exiting the predetermined rotational angle ranges. As an example, if the current angle a is at −30 degrees, the display 18 could start turning on, and as the angle a increases to −15, the display gradually turns on, finally reaching full brightness at −20 degrees. Similarly, the display would also gradually turn off as the angle moved from −20 to −30 degrees in the opposite motion. Extending this to three dimensions, the device 10 display would appear to gradually turn on and off as the device moved through various viewable ranges.

While the above discussion centers on power management relating to enabling the display 18 of the portable device 10, the invention is not limited in this regard. For example, at least one component of the portable device 10 can be selectively turned off in different operation modes. An operation mode may be a power management profile stored on the portable device 10 that may contain customized settings for power management and may be selectively activated by the user. For instance, when the display 18 is off, the processors 602 (or a micro-controller) may be left on to continue to process sensor information. However, other components, such as the communications interface 610 and/or the GPS 618, can be disabled to save power. As another example, the user may desire to have the display 18 and the communications interface 610 off when exercise is being done, but may customize the power management in an exercise operation mode to allow the GPS 618 to be on, so that the user can keep track of his or her distance traveled.

Figure 6:
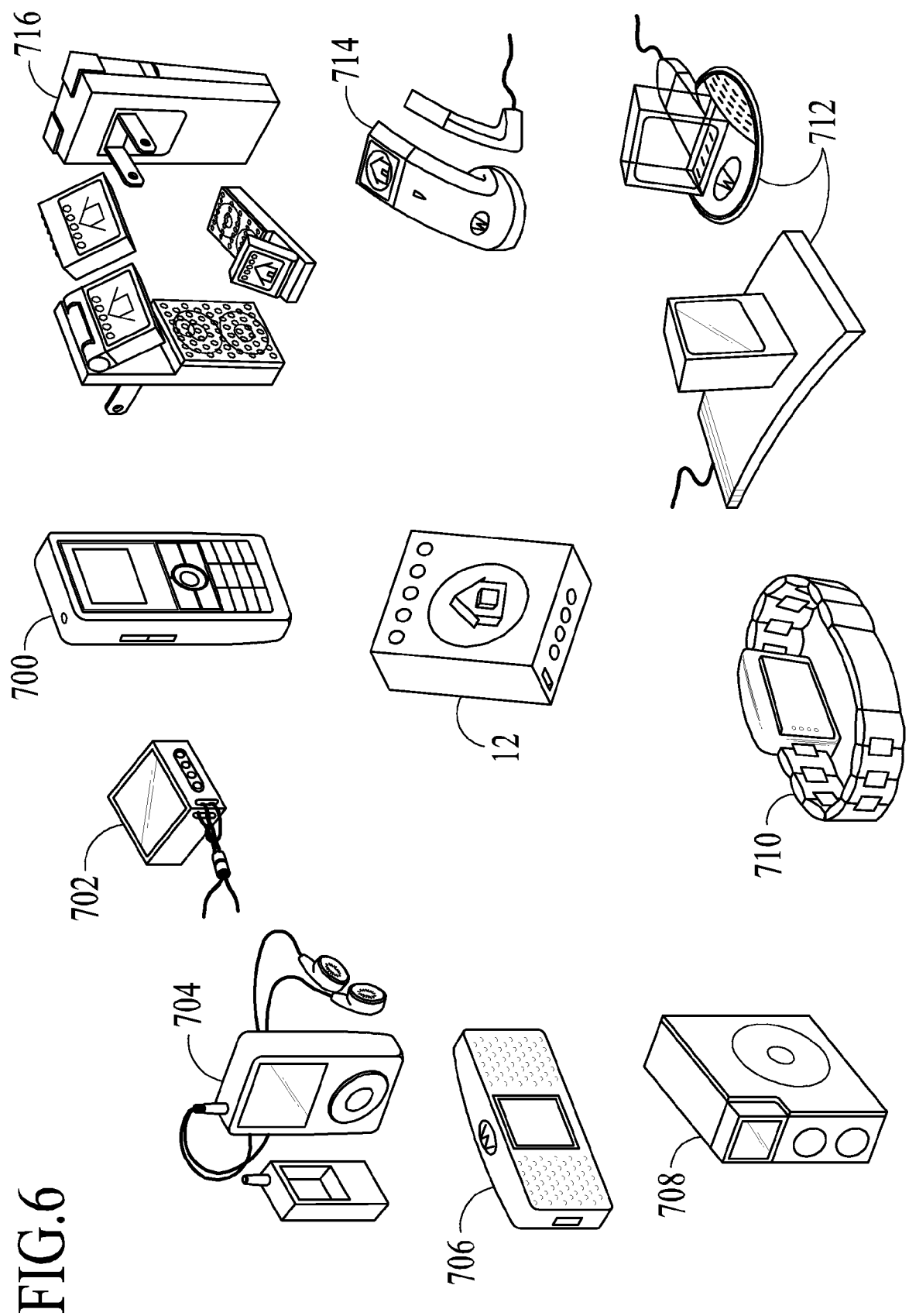
FIG. 6 is a diagram illustrating exemplary types of wearable portable electronic device form factors that could be used with modular movement and receptacle and the power management scheme of the exemplary embodiment.

FIG. 6 is a diagram illustrating exemplary types of portable device form factors that could be used with module 12 and receptacle 22 and the power management scheme of the exemplary embodiment. As shown exemplary types of portable devices that may include standard receptacles 22 for use with module 12 may include a cell phone handset 700, a carrier and strap 702, a media player 704, portable speakers 706, battery dock recharger and speaker 708, a watch 710, a media handset and cradle 712, a telephone handset 714, and a portable charging cradle 716 for the module 12. Through the use of charging cradle 716, the module 12 can be recharged, even while outside of the portable device 10. Thus, the exemplary embodiment provides a module movement 12 that can be used, operated and recharged whether both alone and when inserted into the portable device 10. Other example portable devices include a bike handlebar cradle, a modem housing (e.g., for notebook computers), an adapter to convert to a USB dongle, jewelry, a lanyard, clothing, a keychain and a necklace, for instance.

Figure 7:
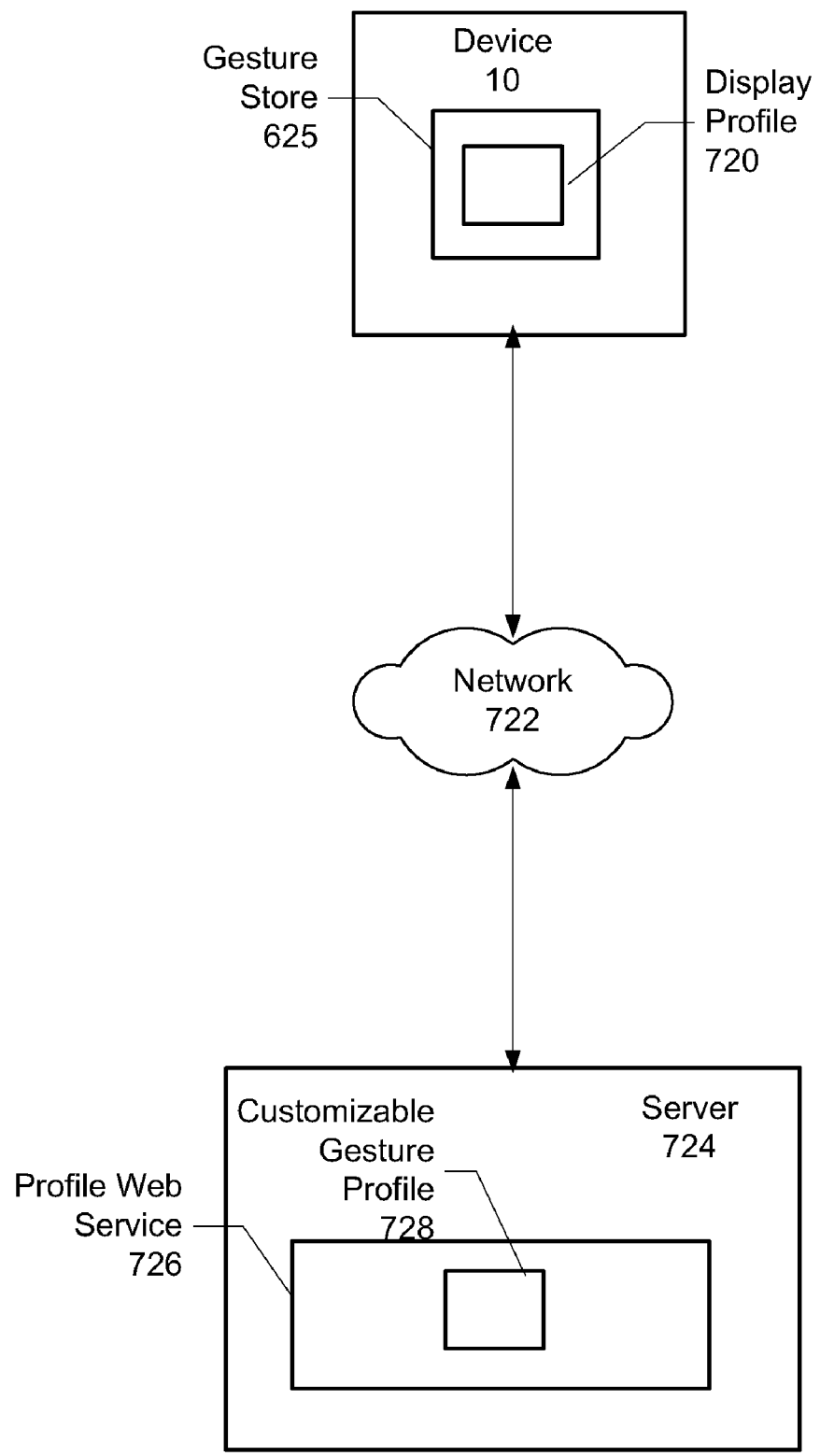
FIG. 7 is a diagram illustrating communication between an exemplary wearable portable electronic device and an exemplary profile web service including at least one customizable gesture profile for the wearable portable electronic device.

FIG. 7 is a diagram illustrating communication between an exemplary portable device 10 and an exemplary profile web service 726 including at least one customizable gesture profile 728 for the portable device 10. In the exemplary embodiment, the gesture store 625 of the portable device 10 may include at least one gesture profile. A gesture profile may include definitions for different gestures that can provide input for the portable device 10. Display profile 720 is an example of a gesture profile, and may include default power management settings of the display, such as the viewable angle ranges and/or proximity sensor settings, for example.

The portable device 10 can be in communication with a server 724, which may include a profile web service 726, through a network 722. The profile web service 726 may include customizable gesture profile 728, which may contain, for example, modified settings for the display profile 720. The customizable gesture profile 728 may differ from the display profile 720 in that the customizable gesture profile 728 may include viewable angle ranges that are adjusted to take into account viewable angle parameters such as, for example, different user heights, arm lengths, locations, and/or time zones. In an exemplary embodiment, the customizable gesture profile 728 may include one or more operation modes for the portable device 10. The user may select a customizable gesture profile 728 from a plurality of precreated stored profiles on the profile web service 726. In an exemplary embodiment, the user may enter his or her personal information relating to one or more of the viewable angle parameters, and a customizable gesture profile 728 may be generated based upon the entered viewable angle parameters. When the user identifies a customizable gesture profile 728 of interest, the user may download the customizable gesture profile 728 to the portable device 10, thereby adjusting the power management settings of the portable device 10. When downloaded, the customizable gesture profile 728 may exist separately from the display profile 720 or it may overwrite the settings within the display profile 720 in the non-volatile memory 626 of the portable device 10.

A gesture-based power management method and system for a portable device with display has been disclosed. The present invention has been described in accordance with the embodiments shown, and one of ordinary skill in the art will readily recognize that there could be variations to the embodiments, and any variations would be within the spirit and scope of the present invention. For example, the portable device may be provided without communication capability and used to store a user's personal information, such as medical records for, instance.

In addition, the embodiments can be implemented using hardware, software, a computer readable medium containing program instructions, or a combination thereof. Software written according to the present invention is to be either stored in some form of computer-readable medium such as memory and is to be executed by a processor. Accordingly, many modifications may be made by one of ordinary skill in the art without departing from the spirit and scope of the appended claims.

We claim:

1. A method for gesture-based power management for a portable device with display, comprising:
    calibrating an inertial sensor to a reference orientation that is relative to a user's body angle, wherein the user's body angle is substantially vertical;
    tracking motion of the portable device with respect to the reference orientation;
    enabling the display when the portable device is within a viewable range, wherein the viewable range is a predefined rotational angle range in each of an x, y, and z axis, to a user based upon a position of the portable device with respect to the reference orientation; and
    responsive to detecting that the user's body angle is not substantially vertical, automatically adjusting the reference orientation and the viewable range by the difference between the user's body angle and a vertical body angle.

2. The method of claim 1 further comprising turning off the display when an object is detected within a predetermined distance of the display for a predetermined amount of time.

3. The method of claim 2 wherein at least one of the predetermined distance and the predetermined amount of time are user configurable.

4. The method of claim 2 wherein the object is detected by a plurality of proximity sensors located on at least one edge of the display.

5. The method of claim 1 wherein the predefined rotational angle range for the x axis is approximately −30 degrees to 180 degrees, the predefined rotational angle range for the y axis is approximately −45 degrees to 45 degrees, and the predefined rotational angle range for the z axis is approximately −90 degrees to 180 degrees.

6. The method of claim 1 further comprising gradually increasing display brightness when entering the predefined rotational angle ranges and gradually reducing display brightness when exiting the predefined rotational angle ranges.

7. The method of claim 1 wherein the predefined rotational angle ranges are reconfigurable by the user.

8. The method of claim 1 wherein the predefined rotational angle ranges comprise different angle ranges corresponding to different wear locations on a user's body.

9. The method of claim 1 further comprising performing the tracking motion of the portable device in response to determining that the portable device is being worn.

10. The method of claim 1 further comprising:
using Bayesian inference to store behavioral patterns of the user; and
adjusting the viewable range based upon the behavioral patterns of the user.

11. The method of claim 1 further comprising:
detecting when the user enters a learning mode; and
changing the viewable range after receiving at least one predetermined indication that the user is viewing the display.

12. The method of claim 1 further comprising selectively turning off at least one component of the portable device when the portable device is in a selected operation mode.

13. A portable device having gesture-based power management, comprising:
an inertial sensor;
a proximity sensor;
a display; and
a microprocessor coupled to the display, the inertial sensor and the proximity sensor, wherein the microprocessor is configured to:
calibrate the inertial sensor to a reference orientation that is relative to a user's body angle, wherein the user's body angle is substantially vertical;
track motion of the portable device with respect to the reference orientation using the inertial sensor;
enable the display when the portable device is within a viewable range, wherein the viewable range is a predefined rotational angle range in each of an x, y, and z axis, to a user based upon a position of the portable device with respect to the reference orientation; and
responsive to detecting that the user's body angle is not substantially vertical, automatically adjusting the reference orientation and the viewable range by the difference between the user's body angle and a vertical body angle.

14. The portable device of claim 13 wherein the microprocessor is further configured to turn off the display when the proximity sensor detects an object within a predetermined distance of the display for a predetermined amount of time.

15. The portable device of claim 14 wherein at least one of the predetermined distance and the predetermined amount of time are user configurable.

16. The portable device of claim 14 wherein the object is detected by a plurality of proximity sensors located on at least one edge of the display.

17. The portable device of claim 13 wherein the predefined rotational angle range for the x axis is approximately −30 degrees to 180 degrees, the predefined rotational angle range for the y axis is approximately −45 degrees to 45 degrees, and the predefined rotational angle range for the z axis is approximately −90 degrees to 180 degrees.

18. The portable device of claim 13 wherein the microprocessor is further configured to gradually increase display brightness when entering the predefined rotational angle ranges and gradually reduce the display brightness when exiting the predefined rotational angle ranges.

19. The portable device of claim 13 wherein the predefined rotational angle ranges are reconfigurable by the user.

20. The portable device of claim 13 wherein the predefined rotational angle ranges comprise different angle ranges corresponding to different wear locations on a user's body.

21. The portable device of claim 13 wherein the microprocessor is further configured to determine if the portable device is being worn, such that the tracking the portable device is performed if it is determined that the portable device is being worn.

22. The portable device of claim 13 wherein the microprocessor is further configured to:
use Bayesian inference to store behavioral patterns of the user; and
adjust the viewable range based upon the behavioral patterns of the user.

23. The portable device of claim 13 wherein the microprocessor is further configured to:
detect when the user enters a learning mode; and
change the viewable range after receiving at least one predetermined indication that the user is viewing the display.

24. The portable device of claim 13 wherein the microprocessor is further configured to selectively turn off at least one component of the portable device when the portable device is in a selected operation mode.

25. An executable software product stored on a non-transitory computer-readable medium containing program instructions for gesture-based power management for a portable device with display, the program instructions for:
calibrating an inertial sensor to a reference orientation that is relative to a user's body angle, wherein the user's body angle is substantially vertical;
tracking motion of the portable device with respect to the reference orientation;
enabling the display of the portable device when the portable device is within a viewable range, wherein the viewable range is a predefined rotational angle range in each of an x, y, and z axis, to a user based upon a position of the portable device with respect to the reference orientation; and
responsive to detecting that the user's body angle is not substantially vertical, automatically adjusting the reference orientation and the viewable range by the difference between the user's body angle and a vertical body angle.

26. A portable device having gesture-based power management, comprising:
a case; and
a module, wherein the module is configured to be removably received by the case and comprises:
an inertial sensor;
a proximity sensor;
a display that is viewable when the module is received by the case; and
a microprocessor coupled to the display, the inertial sensor and the proximity sensor, wherein the microprocessor is configured to:
calibrate the inertial sensor to a reference orientation that is relative to a user's body angle, wherein the user's body angle is substantially vertical;

track motion of the portable device with respect to the reference orientation using the inertial sensor;

enable the display when the portable device is within a viewable range, wherein the viewable range is a predefined rotational angle range in each of an x, y, and z axis, to a user based upon a position of the portable device with respect to the reference orientation; and responsive to detecting that the user's body angle is not substantially vertical, automatically adjusting the reference orientation and the viewable range by the difference between the user's body angle and a vertical body angle.

27. A method for gesture-based power management for a portable device with display, comprising:

calibrating an inertial sensor to a reference orientation that is relative to a user's body angle;

tracking motion of the portable device with respect to the reference orientation;

determining an approximate time of day using data on a location of the portable device;

determining a maximum amount of ambient light available using the approximate time of day; and setting a minimum threshold for a display brightness based on the maximum amount of ambient light available; and enabling the display when the portable device is within a viewable range, wherein the viewable range is a predefined rotational angle range in each of an x, y, and z axis, to a user based upon a position of the portable device with respect to the reference orientation.

28. A portable device having gesture-based power management, comprising:

an inertial sensor;

a proximity sensor;

a display; and a microprocessor coupled to the display, the inertial sensor and the proximity sensor, wherein the microprocessor is configured to:

calibrate the inertial sensor to a reference orientation that is relative to a user's body angle;

track motion of the portable device with respect to the reference orientation using the inertial sensor;

determine an approximate time of day using data on a location of the portable device;

determine a maximum amount of ambient light available using the approximate time of day; and set a minimum threshold for a display brightness based on the maximum amount of ambient light available; and enable the display when the portable device is within a viewable range, wherein the viewable range is a predefined rotational angle range in each of an x, y, and z axis, to a user based upon a position of the portable device with respect to the reference orientation.

* * * * *